United States Patent [19]

Gurney

[11] 3,880,158
[45] Apr. 29, 1975

[54] SPRAY-SPUN BANDAGE COMPOSITION

[75] Inventor: John A. Gurney, East Brunswick, N.J.

[73] Assignee: Johnson & Johnson, New Brunswick, N.J.

[22] Filed: Apr. 4, 1974

[21] Appl. No.: 457,875

[52] U.S. Cl. ............................. 128/155; 260/2.5 E
[51] Int. Cl. ............................................ A61f 13/00
[58] Field of Search ........................... 128/155–157, 128/149, 153, 132 R; 424/45, 47; 260/2.5 E

[56] References Cited
UNITED STATES PATENTS

| 3,419,506 | 12/1968 | Gander | 260/2.5 E |
|---|---|---|---|
| 3,577,516 | 5/1971 | Gould et al. | 128/155 |
| 3,608,070 | 9/1971 | Nouvel | 128/156 |
| 3,705,669 | 12/1972 | Cox et al. | 260/2.5 E |

Primary Examiner—Lawrence W. Trapp
Attorney, Agent, or Firm—Steven P. Berman; Jason Lipow

[57] ABSTRACT

A bandage composition especially suitable for application from aerosol containers onto wound surfaces. These compositions comprise $A_x B_y A_z$ block polymers wherein the $A_x$ and $A_z$ blocks are a non-elastomeric polymers and the $B_y$ block is an elastomeric polymer, together with solvents for the block polymers and propellants. The composition may also include local anesthetics and antibiotic or antiseptic agents. When applied to a wound surface, an opaque adherent flexible fibril mat, which is breathable to air, yet is largely occlusive to liquids is formed.

2 Claims, No Drawings

SPRAY-SPUN BANDAGE COMPOSITION

This application is a continuation-in-part of my co-pending application Ser. No. 219,537, filed Jan. 20, 1972, now abandoned.

DISCLOSURE OF THE INVENTION

The present invention relates to sprayable compositions that are useful for protecting such topical injuries as bruises, abrasions, minor cuts and burns, non-poisonous insect bites and plant or contact dermatitis during the period of their healing. More particularly, this invention relates to compositions which are applied onto wound surfaces from aerosol containers.

The protection of wounds with various forms of adhesive cloth bandages is well known. Yet, despite the wide acceptance of such bandages, the advent of the aerosol container has stimulated efforts to develop a bandage sprayable from such containers emphasizing convenience and ease of application for protection of minor wounds. All bandages must, of course, provide protection to the wound site, forming a physical barrier against contamination, and physical protection against further injury. It is desirable that a bandage should also provide for the circulation of air to the wound while being substantially impervious or occlusive to liquids. Furthermore, a bandage ought to be sufficiently conformable so as not to hinder movement, and sufficiently comfortable so as not to motivate removal. Also, a bandage should wear well, and yet when desired be easily removed by peeling without injury to the healing wound.

Previous attempts to formulate sprayable bandage compositions for delivery from aerosol containers have not entirely met with success. Although they protect wounds satisfactorily, on the whole, they have not met the other requisites of a bandage such as wearability, air circulation and the like. Some commercial sprayable bandages have taken the form of films, but such films, following application, have had extended drying times and, therefore, were subject to dripping or sagging from the wound surface. Furthermore, such films were usually transparent and therefore required an opacifying agent, such as a starch derivative, in order to render the film opaque. From a patient's psychological standpoint, a wound is preferably covered from view during its period of healing.

The compositions of this invention have the advantage that they spray not as wet material that dries forming a film, but rather they are spun in a semi-dry condition to form fibrils which mat, forming a fibrous covering for the wound.

The compositions of this invention can be applied at a minimal spin distance, that is, a minimal distance between the aerosol spray head and the wound surface which results in a less diffuse pattern and a concentration of the bandage where desired. After the mat is formed, there results a breathable-to-air dressing which is largely occlusive to liquids and maintains the wound surface in a clean condition. Furthermore, the dressings of this invention are adherent to the skin, providing for extended wear, and yet can easily be removed by peeling.

The composition of this invention comprises an A–B–A block copolymer wherein the A blocks are non-elastic polymers and the B block is an elastomeric polymer; these polymers being specifically chosen to provide the desirable properties enumerated above in a sprayable bandage composition. The chosen polymer is combined with a specifically chosen solvent system and a propellant system to produce an aerosol delivered spray-on bandage will form the semi-dry fibrils as discussed above.

The block polymers that are suitable for this invention were selected from polymers described in U.S. Pat. No. 3,299,174 issued on Jan. 17, 1967 to Calvin J. Kuhre et al. and U.S. Pat. No. 3,265,765 issued on Aug. 9, 1966 to Geoffrey Holden et al. These polymers have the general formula:

$$A_x\text{—}B_y\text{—}A_z$$

where each A represents an independently selected nonelastomeric polymer block having a number average molecular weight in the range of 2,000 to 100,000 and a glass transition temperature above 33°C each B represents an elastomeric polymer block having a number average molecular weight in the range of 25,000 to 1,000,000 and a glass transition temperature below 10°C. Thus, $x$, $y$ and $z$ are large integers, such that $A_x$, $B_y$ and $A_z$ would in of themselves be recognizable as high polymers.

These block copolymers are to be distinguished from graft polymers, wherein segments depend from intermediate points to a linear chain. One essential characteristic of the block copolymers used herein is that the elastomeric mid-section block has a glass transition temperature below 10°C, preferably below −25°C. Furthermore, while the end-section non-elastomeric blocks may have a molecular weight range from 2,000 to 100,000 and a glass transition temperature above 33°C, it is preferable that the end-section blocks have number average molecular weights from 5,000 to 50,000 each and a glass transition temperature above 50°C. Also, while the elastomeric mid-section block can have a number average molecular weight from 25,000 to 1,000,000 it is preferred that it be between 50,000 and 500,000.

The difference between the glass transition temperature of end-section blocks A and mid-section block B should suitably be at least 40°C, preferably being 100° to 125°C. The end blocks in suitable polymers constitute 10–50%, preferably being 15–40% of the total polymer weight.

Specifically, in accordance with this invention, the A block, or inelastic portion of the copolymer is chosen to be polystyrene having an average molecular weight of from 2,000 to 100,000 and a glass transition temperature of at least 33°C and constitutes about 10–50% of the total copolymer weight.

The B block, or elastomeric portion of the copolymer is selected from the group consisting of polyisoprene and polybutadiene and has a molecular weight of from 25,000 to 1,000,000 and a glass transition temperature of less than 10°C.

The amount of copolymer which can be satisfactorily employed ranges from about 1.5 to 10% by weight of the total bandage composition. The use of a larger quantity of copolymer will usually result in the formation of a film, rather than the desired fibril strands. The use of less copolymer will require an extended spraying time to build up the desired mat, although after sufficient spraying with such a copolymer deficient composition, a satisfactory bandage will eventually form.

In this specific copolymer, the crystalline styrene domain crosslinks provide substantial tensile strength along with a low molecular weight which allows for an increased weight percent solubility. The isoprene or butadiene continuous phase of the copolymer contribute to the elasticity so apparent in these spray-spun dressings. More particularly, the ratio of styrene to isoprene or butadiene and the molecular weight has been found to affect properties of convenience such as the time required to produce a dressing dry enough to use, and an interrelated property of the distance between the spray nozzle and the wound surface during application. These properties are herein referred to as "drying time" and "spin distance." The "spin distance" is the minimum distance required to produce a fibril mat which is free of visible bubbling or wetness and the "drying time" is the interval of time from the instant spraying has been completed until the mat can gently be patted without deformation.

Typical results for the preferred copolymers appear below in Tables 1 and 2. In general, it appears that increases in molecular weight have an appreciable effect on both spinning distance and drying time.

Table 1

Typical Data of A-B-A Styrene Block Copolymers

| Copolymer | Comonomer | wt.% | Relative Viscosity* | Spin Dist. Inches + | Drying time Seconds + |
|---|---|---|---|---|---|
| 1 | Styrene | 30 | 1.230 | 3 | 4 |
|   | Isoprene | 70 |   |   |   |
| 2 | Styrene | 15 | 1.432 | 4 | 5 |
|   | Isoprene | 85 |   |   |   |
| 3 | Styrene | 28 | 1.293 | 4 | 6 |
|   | Butadiene | 72 |   |   |   |
| 4 | Styrene | 40 | 1.435 | 5 | 10 |
|   | Butadiene | 60 |   |   |   |

*An index of molecular weight. Determined at 30°C and 0.4 wt.% in toluene.
+ 6g of copolymer, 5 g tetrahydrofuran, 196g 65/35 and 60/40 dichlorodifluoromethane-vinyl chloride blends.

Table 2

Molecular Weight Comparison of Spinning Factors

| Copolymer, 6g | Mats/can | Can Upright | | Can Inverted | |
|---|---|---|---|---|---|
|  |  | Spin | Dry | Spin | Dry |
| 1* | 26±1 | 4±1 | 7±3 | 5±2 | 8±3 |
| 2+ | 21±5 | 10±3 | 15±4 | 14±3 | 18±4 |

*10g 40/60 actone-cyclohexane, 190g 38/62 vinyl chloride/CF₂Cl₂
+10g 40/60 acetone-cyclohexane, 190g 35/65 vinyl chloride/CF₂Cl₂

In order for the polymer to form the desired fibrils as it leaves the aerosol spray-head, it must be contained in the aerosol can in a dissolved state. This is accomplished by dissolving the copolymer in a solvent system comprising an appropriate propellant blend and another solvent referred to herein as a crystalline crosslinking regulator, i.e., regulating the amount of end-section block crystalline cross-linking domains during use. Preferably the solvent system forms a stable single liquid phase, but solvent systems that are meta-stable, forming a single liquid phase upon agitation of the aerosol container are also satisfactory. It is desirable that the minimum amount of crosslinking regulator solvent be employed so as to promote rapid drying of the mat. As a crystalline crosslinking regulator for the polymers, generally solvents such as cyclic and straight and branched chain hydrocarbons of $C_5$ to $C_9$ in length; the lower alkyl carboxylic acid esters, the di-substituted lower alkyl carbonyls; and the mono and di halogen substituted lower alkyl groups have a solubility parameter of from about 7.3 to about 10. This latter term is defined in *Polymer Handbook* IV pp. 341–368, Brandrup et al. Editors, Interscience Publishers, N.Y., N.Y., (1967). The solvents from the extreme end of the solubility parameter range tend to give a loss of either elasticity or tensile strength, while solvents at the middle of the range and blends of solvents having a solubility parameter at the middle of the range are satisfactory. Some particularly desirable crosslinking regulators are petroleum ether, n-hexane, cyclopentane, cyclohexane, n-heptane, n-octane, iso-octane, tetrahydrofuran, methyl ethyl ketone, ethyl acetate, methylene chloride and acetone. The crosslinking regulator of choice is a mixture of acetone and cyclohexane, in a ratio no less than 30% by weight acetone based on total weight of crosslinking regulator. Preferably the acetone is from 40–80% by weight. As already stated, the minimum quantity of crystalline crosslinking regulator necessary to achieve flexibility in the finished bandage and yet not unduly increase either spin distance or drying time should be employed. This quantity should comprise from about 2–10% by weight of the bandage composition based on the above suitable quantities of copolymer.

In Table 3 there is set forth the effect of the quantity of the crosslinking regulators on drying time and spin distance. Table 4 illustrates the effect of the ratio of acetone to cyclohexane on spinning products.

Table 3

Effect of Solvent on Spin Distance and Drying Times*

| Solvent, g | Upright Spin | Upright Dry | Inverted Spin | Inverted Dry |
|---|---|---|---|---|
| 3.0 | 3.2±0.4 | 3.2±1.1 | 3.1±0.2 | 3.3±1.3 |
| 6.0 | 3.3±0.7 | 4.0±1.4 | 3.2+0.6 | 3.0+1.2 |
| 9.0 | 3.6±0.9 | 4.0±1.2 | 3.4±0.9 | 3.8±1.6 |

*7.0±0.9g of copolymer 1, 180g 52/48 wt.% vinyl chloride dichlorodifluoromethane, 10g dimethyl ether, solvent 40/60 wt.% acetone-cyclohexane.

Table 4

Cyclohexane and Acetone[a]

| % By Weight of Acetone in Cyclohexane/Acetone Mixtures | Upright Spin | Upright Dry | Inverted Spin | Inverted Dry |
|---|---|---|---|---|
| 100 | 4 | 2 | 6 | 5 |
| 80 | 4 | 4 | 10 | 5 |
| 60 | 8±2 | 8±2 | 16±4 | 7 |
| 0 | 6±3 | 6±3 | 14±3 | 11 |

[a]with 6 g copolymer 1; 78.4 g vinyl chloride; 117.6 g dichlorodifluromethane.

To provide the driving force for expulsion of the composition from the aerosol container, a propellant is used. In order to provide for a consistent composition throughout the period of use, as previously stated, it is desirable that the propellant, and the balance of the composition form a single liquid phase. with this criteria in mind, any suitable propellant recognized by the aerosol art is suitable provided that it is inert chemically to the balance of the spray spun bandage composition. Suitable and usually employed propellants include vinyl chloride and mixtures of vinyl chloride and dichlorodifluoromethane. In addition, other propellants such as other fluorochlorohydrocarbons known as the Freons and the Genetrons can also be employed as propellants. The preferred propellant is a blend of dichlorodifluoromethane and vinyl chloride in a range of 40 to 50% by weight propellant of dichlorodifluoromethane and 60 to 50% by weight propellant of vinyl chloride. Blends of propellants having 60% or more dichlorodifluoromethane by weight form two liquid phases, the upper phase containing copolymer 1 (Kraton XT-6101) and a lower phase containing only propellants, and the cyclohexane and acetone blend. Meta-stable solution blends of 65% by weight dichlorodifluoromethane and 35% by weight vinyl chloride can be prepared by dissolving the copolymer first in the vinyl chloride and then adding the dichlorodifluoromethane. These 65/35 blends reverted to a system of two liquid phases after two to three months storage and are not considered as satisfactory as the other specified propellants and propellant blends.

The quantity of propellant used is critical only in that if an insufficient amount is used the driving force to expel the entire composition from the container will be lacking. Generally, the composition comprises from 75–95% by weight propellant. Propellant in excess of this amount is wasteful and requires a prolonged spraying to form a suitable bandage. Using less does not utilize fully the contents and results in inconveniently long spinning distances of the aerosol container, although some suitable bandages will initially be formed until there no longer is sufficient propellant to expel the contents of the container.

In order to improve on the quality of the fibrils formed, it has been found desirable to replace a portion of the usually employed propellant or propellant blend in the formulation with a different propellant herein termed a "fibril regulator". This fibril regulator has a lower boiling point than the usually employed propellant and is capable of developing higher pressures. Such fibril regulators should independently develop a pressure of at least 70 lbs/in$^2$ gauge at 20°C. Preferred fibril regulators include propane, dimethylether, monochloropentafluoroethane (F-115), and chlorodifluoromethane (F-22). They preferably replace no more than about 10% of the usually employed propellant, i.e., no more than about 9.5% by weight of the spray spun bandage composition. Additional fibril regulator does produce finer fibrils but can develop pressures which are excessive for the integrity of the aerosol container under conditions of high temperature, such as can be encountered under storage conditions.

These components, the block polymers, the propellants and the solvent, are those that are essential to a spray-spun bandage formulation. In addition, the formulation, if desired, can also include small but effective amounts of anesthetics, antibiotics and antiseptics.

Examples of antiseptics or anti-infectives which can be included in the spray-spun bandage formulation are the quaternary ammonium salts such as alkyldimethylbenzyammonium chloride commercially available as Zephiran Chloride; ethylmercurithio salicylic acid (commercially available as Thimerosal); and benzyl p-hydroxybenzoate (Benzyl paraben). These are included at concentrations of about 0.5 to 0.01% by weight and like the antibiotics are preferably dissolved in the solvent or propellant to insure uniform application.

Where an antibiotic is employed, it is preferable that it be dissolved in either the solvent or propellant as opposed to being dispersed, although this is satisfactory. The antibiotics are used at concentration of less than 1% of the total formulation weight and generally are effective at a concentration of 0.05–0.01%. The preferred antibiotics are bacitracin and neomycin although depending on the bacterial strains expected to be encountered, erythromycin, the penicillins and tetracyclines, as well, can be employed.

It is sometimes desirable that a local anesthetic be included in the formulation even though the cooling effect of evaporating propellant does provide some anesthesia.

The preferred anesthetics are those of the same type especially benzocaine, ethylaminobenzoate and butylaminobenzoate, which are used in concentrations of from about 0.5 to 0.01% by weight.

To further illustrate the spray spun bandage compositions of this invention, the following examples are set forth for the purpose of elucidation and not limitation.

EXAMPLE I

A spray-spun bandage formulation was prepared by dissolving 6.0g of a block copolymer comprising 30% styrene and 70% isoprene which had a relative viscosity of 1.230 in 10.0g of a cosolvent composed of 40% by weight acetone and 60% by weight cyclohexane. This solution was loaded into a conventional aerosol container fitted to receive a valve with a 0.020 inch inside diameter vapor tap and having a 0.040 inch inside diameter body and capillary dip tube with 190.0g of a blend comprising 38% by weight vinyl chloride and 62% by weight $CF_2Cl_2$. The valve was immediately crimped to the cooled can which completed the filling operation. When the contents of this can were applied to a model wound, the formulation had a spin distance of 4±1 inches. The drying time was 7±3 seconds. When the container was sprayed in the inverted position, the spin distance was 5±2 inches and at this spin distance had a drying time of 8±3 seconds.

The bandage formed had good wear qualities and could be peeled off without difficulty. There were 26±1 mats of an approximate 2 inch diameter delivered from the can that wore well up to 8 hours.

EXAMPLE II

Another spray-spun bandage formulation was prepared by dissolving 6.0g of a block copolymer comprising 15% styrene and 85% isoprene which had a relative viscosity of 1.432 in 10.0g of a solvent as in Example I. This solution was then cold loaded into a conventional aerosol container with 190.0g of a mixture comprising 35% by weight vinyl chloride and 65% by weight dichlorodifluoromethane. When sprayed on a model wound surface the upright can delivered 21±5 mats that were easily removed by peeling or rubbing. These mats had a spin distance of 10±3 inches and a drying time of 15±4 seconds. When the container was sprayed in the inverted position the spin distance was 14±3 inches and the drying time 18±4 seconds.

EXAMPLES III – VI

Formulations were prepared as in Example I except in place of the block copolymer there used, 6.0g of each of the block copolymer referred to in Table I.

EXAMPLE VII

To the solution of copolymer and solvent of Example I is added 0.05g of bacitracin and 0.05g of neomycin.

EXAMPLE VIII

A 48/52 wt % blend of dichlorodifluoromethane vinyl chloride condensed to liquid with a dry ice-isopropanol cold bath was added to a seamless steel aerosol can which contained 7g of copolymer 1 and 3g of 40/60 wt % acetonecyclohexane. Immediately after the blend was weighed in, 10g of dimethyl ether also liquidied with a dry ice bath was added and a valve with a 0.020 in. vapor tap and 0.050 in. capillary dip tube crimped into place.

| | | |
|---|---|---|
| Can pressure at 70°F | — | 60±1 psig |
| Mats/can | — | 46±2 |
| Spin distance, upright | — | 3.4±0.6 in |
| Spin distance, inverted | — | 3.1±0.2 in |
| Drying time, upright | — | 3.4±1.2 sec |
| Drying time, inverted | — | 2.7±1.0 sec |

To determine the effects of the spray-spun bandage on wound healing, the spray-spun bandage of Example VIII was tested on a linear incisional wound model as follows:

The upper backs of four human volunteers were clipped and then prepped with PREPTIC SWAB. Three, superficial incisions 15MM long and approximately 300μ deep were made with a sterile scalpel (blade No. 11). The incisions were then sprayed with the spun dressing for 12–15 seconds at a distance of 4–5 inches. The central portions of the wounds were biopsied once to yield information at 1, 2 and 3 days post wounding. The biopsies were small, elliptical samples obtained after infiltration of these areas with ca. 0.3–0.4cc 2% lidocaine hydrochloride. The fresh tissue was quick-frozen for cryotomy (Slee HR Cryostat). Sections were cut at 6μ, fixed in Wolman's solution and stained with hematoxylin and eosin.

Gross observations of the incisions revealed a slight to moderate eschar formation on day 1 post wounding. The eschar was present on all wounds for the three days post wounding. Inflammation was slight to moderate on all wounds on day 1 post wounding. By day 3 post wounding, only one wound was slightly inflamed. No gross infection was seen in any of the wounds at any of the time periods.

After seven hours of wear only two of the four subjects had the dressing intact over the wounds. The edges of the dressing were not adhered. The intact dressings were resprayed as were the exposed wounds. On day 1 post wounding, only one original dressing was intact. All wounds were resprayed. On day 2 post wounding, one subject had one dressing from day 0 intact. Two subjects had one dressing intact each while the fourth subject had both dressings intact. Once again, all areas were resprayed. By day 3 post wounding, all the dressings were intact.

Three of four wounds were re-epithelialized on day 1 following wounding. The wounds were slightly hyperplastic and a fibrin network was seen in the dermis. Slight inflammation was evidenced by the presence of a few polymorphonuclear leukocytes. An eschar was seen in all of the wounds.

By day 2 post wounding, all wounds were re-epithelialized and slightly depressed. Once again an eschar was seen in all of the wounds. By day 3 post wounding, the epidermis was differentiated as evidenced by the presence of the granular layer. A slight scab remained on the wounds.

Histological evaluation of human incisions dressed with Spun Dressing showed that three of four wounds were re-epithelialized by day 1 post wounding. All wounds were re-epithelialized by day 2 and differentiated by day 3 post wounding. No gross inflammation was seen in these wounds at any of the time periods tested. No dressing particles were seen in the wounds.

These results indicate that the Spun dressed wounds healed better than previously studied untreated wounds.

WHAT IS CLAIMED IS:

1. A bandage composition for dispensing a fibrous covering for a wound from aerosol containers comprising:

about 1.5 to 10% by weight of the bandage composition of an A–B–A block copolymer wherein (1) said A block is polystyrene having an average molecular weight of from 2,000 to 100,000 and a glass transition temperature of at least 33°C and constituting about 10–50% of the total copolymer weight and (2) said B block is selected from the group consisting of polyisoprene and polybutadiene, said B block having a molecular weight of from 25,000 to 1,000,000 and a glass transition temperature of less than 10°C;

about 2–10% by weight of said bandage composition comprising a mixture of acetone and cyclohexane, said mixture comprising no less than 30% by weight of said acetone; and a propellant comprising 75–95% by weight of the bandage composition, a portion of said propellant comprising no more than 10% by weight of said bandage composition being capable of independently developing a pressure of at least 70 pounds per square inch guage at 20°C, said propellant and said acetone-cyclohexane mixture having together a solubility parameter of from about 7.3 to about 10.

2. The composition of claim 1 wherein said acetone in said mixture comprises 40 to 80% by weight.

* * * * *